US012695855B1

(12) United States Patent
Strandborg

(10) Patent No.: US 12,695,855 B1
(45) Date of Patent: Jul. 28, 2026

(54) HARDWARE-ACCELERATED MULTISCOPIC IMAGE GENERATION

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/434,201

(22) Filed: Dec. 29, 2025

(51) Int. Cl.
*H04N 13/125* (2018.01)
*H04N 13/178* (2018.01)
*H04N 13/327* (2018.01)

(52) U.S. Cl.
CPC ......... *H04N 13/125* (2018.05); *H04N 13/178* (2018.05); *H04N 13/327* (2018.05)

(58) Field of Classification Search
CPC ... H04N 13/125; H04N 13/327; H04N 13/178
USPC .......................................................... 348/51
See application file for complete search history.

(56) References Cited

U.S. PATENT DOCUMENTS

| | | | | |
|---|---|---|---|---|
| 12,388,971 B1* | 8/2025 | Strandborg | ............ | H04N 13/32 |
| 12,432,332 B1* | 9/2025 | Strandborg | .......... | H04N 13/383 |
| 12,474,578 B1* | 11/2025 | Konttori | ............ | G02B 27/0101 |
| 12,563,172 B1* | 2/2026 | Strandborg | .......... | H04N 13/327 |
| 2013/0057644 A1* | 3/2013 | Stefanoski | ........... | H04N 13/111 |
| | | | | 348/42 |
| 2015/0222886 A1* | 8/2015 | Bathiche | ................ | G02B 30/28 |
| | | | | 348/59 |
| 2019/0124313 A1* | 4/2019 | Li | ........................ | H04N 13/324 |

* cited by examiner

*Primary Examiner* — Behrooz M Senfi
(74) *Attorney, Agent, or Firm* — Ziegler IP Law Group, LLC.

(57) ABSTRACT

A hardware apparatus receives a first image and a second image for a first eye and a second eye of at least one user, and metadata indicating, relative locations of light-emitting cells that can be employed to emit light toward the first eye and the second eye with respect to multiscopic cells in a multiscopic display. The hardware apparatus operates in a streaming manner to: determine, based on the metadata and calibration parameters specific to the multiscopic display, which light-emitting cells are to be employed to emit light toward the first eye and which light-emitting cells are to be employed to emit light toward the second eye; obtain emission values for the determined light-emitting cells based on the first image and the second image; and outputs the output image comprising emission values for the light-emitting cells.

16 Claims, 4 Drawing Sheets

100

102      104      106

108

108

108

200

206

208  210

HARDWARE-ACCELERATED MULTISCOPIC IMAGE GENERATION

TECHNICAL FIELD

The present disclosure relates to multiscopic image generation; and more particularly, to hardware apparatuses for generating output images for multiscopic displays. The present disclosure also relates to multiscopic display systems comprising such hardware apparatuses. The present disclosure further relates to methods for generating output images for multiscopic displays.

BACKGROUND

Multiscopic displays, including autostereoscopic displays employing lenticular arrays, parallax barriers, or similar multiscopic optical elements, are configured to direct different portions of emitted light toward different eyes of at least one user in order to present depth-dependent imagery without the use of wearable optics. Such displays typically comprise an array of light-emitting cells and a multiscopic optical element comprising a plurality of multiscopic cells, where each multiscopic cell directs light from different light-emitting cells of the array toward different viewing directions.

In order to accurately present multiscopic imagery, the spatial relationship between the multiscopic optical element and the array of light-emitting cells must be taken into account when determining which light-emitting cells are employed to emit light toward a given eye. In practical implementations, this relationship is influenced by factors such as the pitch, orientation, and phase of the multiscopic optical element relative to the array of light-emitting cells. As a result, generating a correct multiscopic emission pattern requires determining, at the granularity of individual light-emitting cells, which eye a given light-emitting cell can contribute to across the full image resolution of the display. In this regard, multiscopic presentation is achieved by selectively employing different light-emitting cells associated with a given multiscopic cell to emit light toward different viewing directions corresponding to different eyes.

At the same time, multiscopic displays intended for large fields-of-view or large physical display sizes require high pixel densities in order to achieve acceptable angular resolution and image quality. For example, in a display employing a lenticular array with a lenticular pitch on the order of a few tenths of a millimetre, a width of a single multiscopic cell (namely, a lenticular lens) may span multiple light-emitting cells of the array. To ensure sufficient angular separation between views, the pixel pitch of the array is typically several times smaller than the lenticular pitch of the lenticular array, leading to a substantial increase in the required full image resolution of the display.

By way of example, a display having a diagonal size of approximately 27 inches and a full image resolution of 5120×2880 pixels (commonly referred to as a 5K display) comprises on the order of 14 megapixels per frame. At a refresh rate of 60 Hz, this corresponds to approximately 843 megapixels per second of output image data. In contrast, input images corresponding to different eyes may be generated at a substantially lower intermediate image resolution due to the angular resolution limits imposed by the multiscopic optical element. For instance, assuming an effective resolution reduction factor of approximately three along one dimension, the input images corresponding to the different eyes may each have a resolution on the order of 1700×960 pixels, corresponding to approximately 1.55 megapixels per eye and approximately 3.11 megapixels per frame in total.

By way of comparison, display output interfaces commonly supported by system-on-chip devices are often limited to output data rates on the order of a few hundred megapixels per second, such as those associated with 4K-class display resolutions at reduced refresh rates, which are substantially lower than the data rates required to drive high-resolution multiscopic displays at standard video frame rates.

Despite the reduced resolution of the input images, the output image must still be produced at the full image resolution of the display in order to drive the array of light-emitting cells. Conventionally, the generation of this full-resolution output image is performed as part of a general-purpose graphics processing pipeline. This approach typically requires reading, processing, and writing full-resolution image data at the display refresh rate, even when the input images are provided at an intermediate image resolution that is lower than the full image resolution.

For high-resolution multiscopic displays operating at standard video frame rates, this processing places significant demands on memory bandwidth and computational resources. In many systems, the bandwidth required merely to read out or write full-resolution image data exceeds the practical capabilities of the system-on-chip or graphics subsystem, particularly when combined with other display, rendering, or system workloads. In systems configured to support multiple simultaneous users, the generation of separate input images for each user further increases the amount of image data that must be processed to produce the full-resolution output image, exacerbating the associated bandwidth and computational demands.

These bandwidth and processing constraints limit the practical scalability of multiscopic displays, especially in systems where cost, power consumption, or thermal constraints restrict the use of high-end processing hardware. As display resolutions and refresh rates continue to increase, and as multiscopic displays are considered for a broader range of devices and form factors, the computational and memory overhead associated with generating full-resolution output images for multiscopic displays becomes an increasingly significant obstacle to an efficient system design.

Accordingly, there exists a need for improved techniques for generating output images for multiscopic displays that reduce the processing and memory burden associated with full-resolution multiscopic emission pattern generation, while preserving accurate eye-specific light delivery based on the geometry of the multiscopic optical element.

SUMMARY

The present disclosure seeks to provide a hardware apparatus, a multiscopic display system and a method for generating an output image for a multiscopic display with reduced processing and memory bandwidth requirements. The aim of the present disclosure is achieved by a hardware apparatus and a multiscopic display system comprising such a hardware apparatus that receives a first image and a second image corresponding to a first eye and a second eye of at least one user at an intermediate image resolution, together with metadata indicating relative locations of light-emitting cells that can be employed to emit light toward the first eye and the second eye with respect to multiscopic cells of a multiscopic optical element, and that determines emission values for an array of light-emitting cells to generate the output image at a full image resolution, as defined in the appended independent claims to which reference is made. Advantageous features, related to metadata representation, interpolation, crosstalk compensation, image processing, and system integration, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
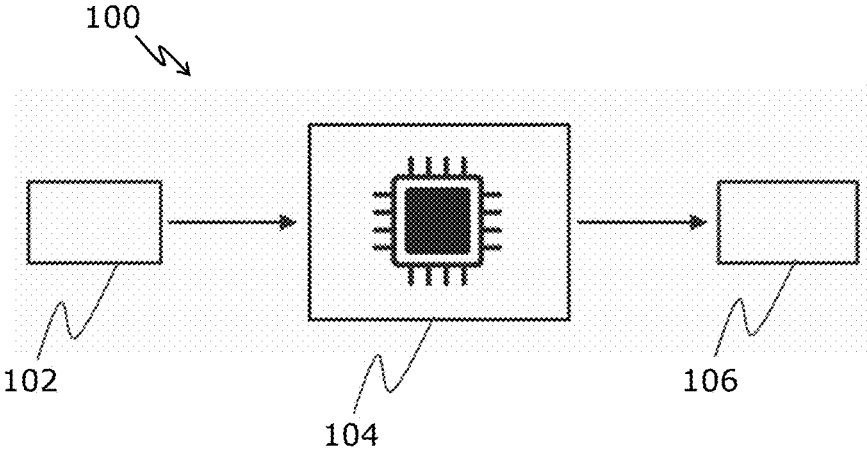
FIG. 1A is a schematic illustration of a hardware apparatus for generating an output image for a multiscopic display, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a hardware apparatus for generating an output image for a multiscopic display, the multiscopic display comprising an array of light-emitting cells and a multiscopic optical element comprising a plurality of multiscopic cells, the hardware apparatus comprising:

an input interface configured to receive:

a first image and a second image corresponding to a first eye and a second eye of at least one user, respectively, wherein the first image and the second image are provided at an intermediate image resolution that is lower than a full image resolution of the output image; and metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye;

processing circuitry configured to operate in a streaming manner to:

for the given multiscopic cell, determine, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element; and obtain emission values for the determined light-emitting cells based on the first image and the second image; and an output interface configured to output the output image, the output image comprising emission values for the array of light-emitting cells.

Pursuant to the present disclosure, the aforementioned hardware apparatus reduces processing load and memory bandwidth consumption associated with generating an output image for the multiscopic display at the full image resolution. This is achieved by receiving the first image and the second image corresponding to respective eyes of the at least one user at the intermediate image resolution, together with the metadata indicating the relative locations of the light-emitting cells with respect to the multiscopic cells of the multiscopic optical element, and by determining emission values for the array of light-emitting cells based on the received images and the metadata.

By performing determination of which light-emitting cells are to be employed to emit light toward the first eye and toward the second eye based on the calibration parameters specific to the multiscopic display (hereinafter referred to as "multiscopic emission determination"), the hardware apparatus avoids the need for general-purpose processing units to perform per-light-emitting-cell multiscopic emission pattern generation at the full image resolution. As a result, high-bandwidth read, write, and processing operations on full-resolution image data are removed from the general-purpose graphics processing pipeline.

Furthermore, because the processing circuitry of the hardware apparatus operates in a streaming manner, the emission values for the output image are generated progressively as the first image, the second image and the metadata are received, without requiring storage or random access to a full-resolution framebuffer. Such a streaming operation enables generation of the output image with bounded and predictable resource usage, reducing peak memory bandwidth demands and limiting the need for large intermediate buffers. Consequently, the hardware apparatus enables scalable generation of full-resolution multiscopic output images even as display resolutions and refresh rates increase.

By offloading the multiscopic emission determination from general-purpose processing units and confining it to a dedicated hardware apparatus, embodiments of the present disclosure allow processing resources of a general-purpose processing unit to be preferentially allocated to generation of the first image and the second image, while the hardware apparatus reliably produces the full-resolution output image required to drive the array of light-emitting cells. As a result, high-resolution multiscopic displays can be implemented without requiring system-on-chip devices or processing platforms with high display output capability, thereby enabling practical deployment using lower-cost system-on-chip devices or processing platforms under constraints of processing capability, memory bandwidth, power consumption, and thermal budget.

In a second aspect, an embodiment of the present disclosure provides a method for generating an output image for a multiscopic display, the multiscopic display comprising an array of light-emitting cells and a multiscopic optical element comprising a plurality of multiscopic cells, the method comprising:

receiving a first image and a second image corresponding to a first eye and a second eye of at least one user, respectively, wherein the first image and the second image are provided at an intermediate image resolution that is lower than a full image resolution of the output image;

receiving metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye;

for the given multiscopic cell, determining, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element;

obtaining emission values for the determined light-emitting cells based on the first image and the second image; and outputting the output image, the output image comprising emission values for the array of light-emitting cells, wherein determining the light-emitting cells, obtaining the emission values and outputting the output image are performed in a streaming manner.

Pursuant to the present disclosure, the aforementioned method for generating an output image for a multiscopic display reduces computational load and memory bandwidth consumption associated with full-resolution multiscopic emission pattern generation. This is achieved by receiving the first image and the second image corresponding to respective eyes of the at least one user at the intermediate image resolution, receiving the metadata indicating relative locations of light-emitting cells with respect to multiscopic cells of a multiscopic optical element, and obtaining the emission values for an array of light-emitting cells based on the received images, the metadata, and the calibration parameters of the multiscopic display.

By determining, for a given multiscopic cell, which light-emitting cells are employed to emit light toward the first eye and which light-emitting cells are employed to emit light toward the second eye based on the metadata and the calibration parameters, the method avoids generating or processing full-resolution eye-specific images. Instead, eye-specific images (namely, the first image and the second image) are resolved at the granularity of individual light-emitting cells only at the stage of producing the output image. As a result, redundant computation and memory transfers associated with full-resolution multiscopic image generation are avoided.

Furthermore, because determining the light-emitting cells, obtaining the emission values, and outputting the output image are performed in a streaming manner, the method enables progressive generation of the output image as the first image, the second image, and the metadata are received. Such a streaming execution reduces the need for full-frame buffering and random access to large intermediate image representations, thereby lowering peak memory usage and reducing latency associated with batch-oriented processing of full-resolution image data. The method thus supports predictable and bounded resource usage during output image generation.

By decoupling generation of the first image and the second image from generation of the full-resolution output image, and by executing the multiscopic emission determination in a streaming manner, the method enables scalable generation of output images for multiscopic displays as display resolutions, refresh rates, or numbers of supported users increase. Consequently, the method facilitates efficient and reliable multiscopic image generation while reducing demands on processing capability and memory bandwidth, thereby supporting practical implementation of multiscopic displays under constrained system resources.

In a third aspect, an embodiment of the present disclosure provides a multiscopic display system comprising:

a multiscopic display comprising an array of light-emitting cells and a multiscopic optical element comprising a plurality of multiscopic cells;

a hardware apparatus according to the aforementioned first aspect; and a processing unit configured to:

generate a first image and a second image corresponding to a first eye and a second eye of at least one user, respectively;

generate metadata indicating relative locations of light-emitting cells that can be employed to emit light toward the first eye and the second eye with respect to multiscopic cells of the multiscopic optical element; and provide the first image, the second image, and the metadata to the hardware apparatus.

Pursuant to the present disclosure, the aforementioned multiscopic display system reduces system-level processing load and memory bandwidth requirements associated with generating output images for the multiscopic display by functionally partitioning image generation and multiscopic emission determination between the processing unit and the dedicated hardware apparatus. This is achieved by configuring the processing unit to generate the first image and the second image corresponding to respective eyes of the at least one user, together with the metadata indicating relative locations of light-emitting cells with respect to multiscopic cells of the multiscopic optical element, and by providing the first image, the second image, and the metadata to the hardware apparatus for generation of the output image at the full image resolution.

By delegating the multiscopic emission determination to the hardware apparatus, the multiscopic display system avoids performing per-light-emitting-cell emission decisions within the processing unit or general-purpose graphics processing pipeline. As a result, the processing unit is relieved from executing full-resolution multiscopic emission pattern generation, allowing it to focus on generation of eye-specific image content (namely, the first image and the second image) at the intermediate image resolution. This separation of responsibilities reduces contention for memory bandwidth and computational resources within the processing unit, particularly in systems where multiple display, rendering, or system tasks are executed concurrently.

Furthermore, because the hardware apparatus operates in a streaming manner to generate the output image based on the received images, the metadata, and the calibration parameters specific to the multiscopic display, the multiscopic display system supports continuous and scalable output image generation with predictable resource usage. Such a streaming operation reduces the need for large intermediate buffers at the system level and mitigates peak memory bandwidth demands that would otherwise arise from batch-oriented processing of full-resolution image data.

By integrating the hardware apparatus with the multiscopic display system, embodiments of the present disclosure enable implementation of high-resolution multiscopic displays without requiring the processing unit to support high display output data rates or full-resolution multiscopic emission processing. Consequently, the multiscopic display system facilitates practical deployment of multiscopic displays under constraints of processing capability, memory bandwidth, power consumption, and thermal budget, while maintaining accurate eye-specific light delivery based on the geometry of the multiscopic optical element.

It will be appreciated that the multiscopic display may be implemented as a heads-up display (HUD) in a vehicle. In some implementations, the multiscopic display may be implemented as a transparent display integrated into a windshield of the vehicle. One example of such a transparent display is described in U.S. Pat. No. 12,477,095, titled "Augmenting Reality with Multiscopic See-through Display", which is incorporated herein by reference for illustrative purposes.

In other implementations, the multiscopic display may be implemented as a non-transparent display used in conjunction with an optical combiner integrated into the windshield. In such implementations, the optical combiner is arranged on an optical path of the non-transparent display and on an optical path of a real-world light field from a real-world environment.

It will also be appreciated that the hardware apparatus, the method, and the multiscopic display system described herein are not restricted to implementation in an HUD alone. Rather, they may be employed in a variety of other applications, including, by way of example, digital signage, three-dimensional product demonstrations, immersive educational visualizations, and training systems, among others.

By way of illustration, there will now be described how the aforementioned operations can be performed at the hardware apparatus pursuant to embodiments of the present disclosure.

Receiving First Image, Second Image, and Metadata:

The first image and the second image correspond to image content intended for the first eye and the second eye of the at least one user, respectively. In some implementations, the at least one user comprises a single user. In other implementations, the at least one user comprises a plurality of users; in such implementations, separate pairs of first images and second images are provided for each of the plurality of users. The first image and the second image are provided at the intermediate image resolution that is lower than the full image resolution of the output image. In some implementations, the first image and the second image are generated by a processing unit, such as a graphics processing unit or a general-purpose processor. The first image and the second image may be generated based on a three-dimensional (3D) rendered scene, graphical content, two-dimensional (2D) user interface elements, or a video stream. The intermediate image resolution may be selected based on angular resolution limits imposed by the multiscopic optical element, such that increasing the resolution of the first image and the second image beyond the intermediate image resolution would not result in perceptually distinguishable improvements for the respective eyes.

The first image and the second image can be received via the input interface of the hardware apparatus using any suitable data transport mechanism, such as a parallel pixel bus, a serial display interface, a memory-mapped buffer, or a packet-based streaming interface. In some implementations, the first image and the second image are transmitted as separate image streams. In other implementations, the first image and the second image are combined into a single composite image, for example using a side-by-side or stacked arrangement. In such implementations, the hardware apparatus may also receive control information indicating which portion(s) of the composite image correspond to the first image and which portion(s) correspond to the second image. Alternatively, such information may be pre-stored in the hardware apparatus in the form of predefined configuration information.

In one example implementation, the processing unit is configured to output the first image and the second image, together with the metadata, within a single composite image. In such an implementation, the first image and the second image may be arranged in a side-by-side or stacked arrangement within the composite image. The metadata may be embedded within the composite image, for example in one or more dedicated regions, channels, or planes of the composite image. Alternatively, the metadata may be provided in association with the composite image via accompanying control information.

The hardware apparatus is configured to receive the composite image and to identify, based on the predefined configuration information or the received control information, which portions of the composite image correspond to the first image, which portions correspond to the second image, and, optionally, which portions or channels correspond to the metadata.

The metadata received by the hardware apparatus indicates, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye. The metadata thus encodes, at a granularity lower than the full image resolution, information describing how the relative locations of light-emitting cells that can be employed to emit light toward respective eyes vary across the plurality of multiscopic cells of the multiscopic optical element. Essentially, the metadata provides geometric information describing how light emitted from the array of light-emitting cells propagates through the multiscopic optical element toward the first eye and the second eye of the at least one user.

In some implementations, the metadata is generated by the processing unit based on calibration data of the multiscopic display and tracked positions of the first eye and the second eye relative to an image plane of the multiscopic display. In other implementations, the metadata is derived from a precomputed calibration model. For example, during manufacture or installation of the multiscopic display, the calibration parameters indicating the positional relationship between the light-emitting cells of the array and the multiscopic cells of the multiscopic optical element may be determined. Based on these calibration parameters, and for a range of possible eye positions (for example, within an eyebox of the multiscopic display), relative location information identifying eye-specific contributing light-emitting cells may be precomputed and stored. During operation, the tracked positions of the first eye and the second eye may be used to select appropriate relative locations for inclusion in the metadata.

The metadata may be provided at a lower spatial resolution than the full image resolution of the output image, independently of the intermediate image resolution of the first image and the second image. As an example, the metadata may be provided with one metadata sample corresponding to a region spanning multiple light-emitting cells on a per-multiscopic-cell basis.

The result of this operation is that the hardware apparatus has access to:

(a) the first image and the second image at the intermediate image resolution, and (b) the metadata indicating the relative locations of light-emitting cells with respect to multiscopic cells for emission toward the first eye and the second eye.

These form the input for subsequent multiscopic emission determination and generation of the output image at the full image resolution.

Determining Light-Emitting Cells Based on Metadata and Calibration Parameters:

Determining the light-emitting cells comprises identifying, for a given multiscopic cell of the multiscopic optical element, which light-emitting cells of the array are to be employed to emit light toward the first eye and which light-emitting cells of the array are to be employed to emit light toward the second eye, based on the received metadata and the calibration parameters specific to the multiscopic display.

The calibration parameters indicate the positional relationship between the light-emitting cells of the array and the multiscopic cells of the multiscopic optical element. Such calibration parameters may include, for example, one or more of: a pitch of the multiscopic optical element, a phase offset between the multiscopic optical element and the array of light-emitting cells, an orientation of the multiscopic optical element relative to the array, a thickness of a multiscopic cell (for example, in case of a lenticular array or a lenslet array). These calibration parameters may be determined during manufacture, installation, or calibration of the multiscopic display.

The calibration parameters may be pre-stored in the hardware apparatus (for example, in non-volatile or otherwise persistent storage). Additionally or alternatively, at least a portion of the calibration parameters may be provided to the hardware apparatus during operation, for example by being embedded within the composite image (such as within one or more dedicated regions, channels, or planes) and/or transmitted via a side channel separate from image sample transport, such as through register programming, a control bus, or accompanying control information.

For a given multiscopic cell, the hardware apparatus uses the metadata in conjunction with the calibration parameters to associate relative locations indicated by the metadata with corresponding light-emitting cells of the array on whose optical path the given multiscopic cell lies. Based on this association, the hardware apparatus determines which of the light-emitting cells are to be employed to emit light toward the first eye and which of the light-emitting cells are to be employed to emit light toward the second eye. Light-emitting cells that are not indicated by the metadata as contributing to either eye for the given multiscopic cell may be excluded from emission for the given multiscopic cell. Accordingly, for a given light-emitting cell, the determination may result in the given light-emitting cell being employed to emit light toward the first eye, employed to emit light toward the second eye, or not employed to emit light toward any eye.

In some implementations, determining the light-emitting cells is performed independently for each multiscopic cell of the multiscopic optical element. As a result, different multiscopic cells may be associated with different sets of light-emitting cells for emission toward the first eye and the second eye, depending on the geometry of the multiscopic optical element, the calibration parameters, and the tracked positions of the first eye and the second eye relative to the image plane.

The determination may further account for periodicity of the multiscopic optical element. For example, light directed toward a given eye through a particular multiscopic cell may originate from light-emitting cells that are located not only within a region directly underlying that multiscopic cell, but also within regions associated with neighbouring multiscopic cells. The calibration parameters are used to ensure that such periodic contributions are correctly associated with the given multiscopic cell when determining the light-emitting cells to be employed for each eye.

The result of this operation is that the hardware apparatus has identified:

(a) a first set of light-emitting cells to be employed to emit light toward the first eye, and (b) a second set of light-emitting cells to be employed to emit light toward the second eye, wherein the identified sets are determined based on the received metadata and the calibration parameters of the multiscopic display. These identified light-emitting cells form the basis for subsequent determination of emission values and generation of the output image.

Obtaining Emission Values for Determined Light-Emitting Cells:

Obtaining the emission values comprises assigning, for each light-emitting cell determined to be employed to emit light toward one of the first eye and the second eye, an emission value based on respective one of the first image and the second image corresponding to that one of the first eye and the second eye.

Once the first set of light-emitting cells to be employed to emit light toward the first eye and the second set of light-emitting cells to be employed to emit light toward the second eye have been identified, the hardware apparatus obtains the emission values for light-emitting cells of the first set and light-emitting cells of the second set by mapping image data from the first image to the light-emitting cells of the first set and by mapping image data from the second image to the light-emitting cells of the second set. Accordingly, light-emitting cells determined to emit light toward the first eye obtain their emission values from the first image, and light-emitting cells determined to emit light toward the second eye obtain their emission values from the second image.

Because the first image and the second image are provided at the intermediate image resolution, obtaining the emission values may comprise associating regions or samples of the first image and the second image with corresponding light-emitting cells based on their relative positions within the multiscopic cell. Image samples from the first image and the second image may be associated with different light-emitting cells, depending on the spatial relationship between the intermediate image resolution and the arrangement of light-emitting cells in the array.

The emission values may represent intensity values, luminance values, or colour component values for the light-emitting cells, depending on the configuration of the multiscopic display. As an example, where the array of light-emitting cells comprises colour light-emitting cells, obtaining the emission values may comprise obtaining separate emission values for multiple colour components. As another example, where the array of light-emitting cells comprises monochrome light-emitting cells, obtaining the emission values may comprise obtaining a single emission value per light-emitting cell. The specific representation of emission values is implementation-dependent and does not affect the determination of which light-emitting cells are employed for each eye.

Light-emitting cells that are not determined to be employed to emit light toward either the first eye or the second eye may be assigned emission values corresponding to no emission or reduced emission, such that they do not contribute to the perceived image for the at least one user.

The result of this operation is that the emission values are obtained for the light-emitting cells determined to be employed for emission toward the first eye and the second eye, respectively. These emission values form the basis for generation of the output image comprising emission values for the array of light-emitting cells.

Outputting Output Image:

Outputting the output image comprises providing, via the output interface of the hardware apparatus, the output image comprising the emission values obtained for the array of light-emitting cells, such that the output image can be used to drive the multiscopic display.

Once the emission values have been obtained for the light-emitting cells determined to be employed to emit light toward the first eye and the second eye, the hardware apparatus assembles the emission values into the output image at the full image resolution of the multiscopic display. The output image thus represents, for each light-emitting cell of the array, an emission value that controls light emission from that light-emitting cell during display operation.

The output image may be output via the output interface using any suitable display or data interface, such as a parallel display interface, a serial display interface, a memory-mapped framebuffer interface, or a packet-based output interface. In some implementations, the output image is provided directly to display driver electronics associated with the multiscopic display. In other implementations, the output image is written to a memory buffer from which it is subsequently read by display controller circuitry.

In some implementations, outputting the output image comprises outputting the emission values for all light-emitting cells of the array for a given display update interval. In other implementations, outputting the output image may comprise outputting the emission values incrementally for subsets of the array of light-emitting cells, provided that, over the course of the display update interval, emission values are output for the full array at the full image resolution.

The output image may be output in a format compatible with the arrangement of the array of light-emitting cells. For example, where the array of light-emitting cells is arranged in a two-dimensional grid, the output image may comprise a two-dimensional array of emission values corresponding to respective light-emitting cells. Where the array comprises colour light-emitting cells, the output image may include emission values for multiple colour components per light-emitting cell. Where the array comprises monochrome light-emitting cells, the output image may include a single emission value per light-emitting cell.

The result of this operation is that the output image, comprising emission values for the array of light-emitting cells at the full image resolution, is provided by the hardware apparatus for display, thereby enabling the multiscopic display to emit eye-specific light toward the first eye and the second eye in accordance with the determined multiscopic emission pattern.

Streaming Operation:

Pursuant to the present disclosure, determining the light-emitting cells and obtaining the emission values are performed in a streaming manner. In this regard, the hardware apparatus processes the first image, the second image, and the metadata progressively, such that determination of light-emitting cells and obtaining of emission values are carried out without requiring that the first image, the second image, the metadata, or the output image be fully stored or processed as complete frames prior to further operation.

Accordingly, the hardware apparatus processes portions of the first image, the second image, and corresponding portions of the metadata sequentially, for example on a per-multiscopic-cell basis, a per-region basis, or a per-line basis. For each such portion, the hardware apparatus determines the corresponding light-emitting cells based on the metadata and the calibration parameters and obtains emission values for the determined light-emitting cells based on the first image and the second image, before processing subsequent portions.

By performing the determining and the obtaining in a streaming manner, the hardware apparatus avoids buffering full-resolution intermediate representations of a multiscopic emission pattern. Instead, intermediate results are consumed as they are produced, thereby reducing memory usage and limiting peak memory bandwidth requirements. This streaming operation further enables deterministic and bounded processing latency, which is advantageous for high-resolution multiscopic displays operating at standard video refresh rates. In some implementations, the streaming processing employs bounded local buffering, such as one or more line buffers, without requiring storage of full-resolution frames.

Outputting the output image is also performed in a streaming manner. Accordingly, emission values for subsets of the array of light-emitting cells are output via the output interface progressively as they are obtained, rather than waiting for emission values for an entirety of the array to be available. Over the course of a display update interval, emission values are output for the full array of light-emitting cells at the full image resolution, such that the complete output image is delivered to the multiscopic display.

For streaming output implementations, the output interface may provide emission values directly to display driver circuitry or display controller electronics as they are generated. Alternatively, the emission values may be written incrementally to a memory buffer that is read by display controller circuitry in a coordinated manner. The specific sequencing of streaming output is implementation-dependent and does not affect the correctness of the generated output image.

Throughout the present disclosure, references to operations performed "for a given multiscopic cell" are intended to describe the manner in which the operations are carried out for an individual multiscopic cell for purposes of explanation and clarity. During normal operation of the hardware apparatus, the same operations are performed for the plurality of multiscopic cells of the multiscopic optical element in a similar manner. In particular, the determination of light-emitting cells, the obtaining of emission values, and the generation of the output image are applied repeatedly across the multiscopic cells of the multiscopic optical element as part of the streaming processing described herein, without requiring separate buffering or distinct processing logic for different multiscopic cells.

Furthermore, in some implementations, the metadata is structured as a 2D map corresponding to the spatial layout of the first image and the second image at the intermediate image resolution. Each location of the 2D map is associated with a corresponding region of the multiscopic display and encodes relative locations of light-emitting cells for a given multiscopic cell. Throughout the present disclosure, the term "eye-specific visibility information" has been used to refer to the metadata indicating, for a given multiscopic cell of the multiscopic optical element, relative locations of light-emitting cells on whose optical path the given multiscopic cell lies that can be employed to emit light toward a respective eye of the at least one user.

Optionally, in this regard, the relative locations of light-emitting cells for a given eye are expressed as a range with respect to a reference position on the given multiscopic cell. A pair of values may be used to define a beginning and an end of the range with respect to the reference position on the given multiscopic cell. The pair of values may be represented as a two-vector, where a first component indicates a beginning position of the range and a second component indicates an end position of the range. Alternatively, the pair of values may include a centre value and an extent value, which indicate the beginning position and the end position of the range using the extent value on both sides of the centre value.

The reference position may correspond, for example, to a centre line of the multiscopic cell, or another predefined geometric feature of the multiscopic cell. In implementations where the multiscopic optical element is a lenticular array and the given multiscopic cell is a lenticular lens, the reference position on the lenticular lens may correspond to a top crest or vortex of the lenticular lens. Relative locations are expressed with respect to this reference position.

As an example, a relative location value of zero may correspond to a light-emitting cell positioned directly underneath the reference position of the multiscopic cell. A positive value may indicate a position offset in a first direction from the reference position (for example, to the right of a lenticular crest), while a negative value may indicate a position offset in an opposite direction (for example, to the left of the lenticular crest).

In one illustrative example, a range expressed as −3.5 to −2 indicates that light-emitting cells located between 3.5 and 2 light-emitting cell pitches to the left of the reference position on the multiscopic cell are visible to the given eye. Light-emitting cells whose relative positions fall within this range are considered to contribute light toward the given eye for the given multiscopic cell.

In some implementations, the values defining the range are expressed in units of light-emitting cell pitch. In other implementations, the values are expressed as fractions or multiples of a width of the given multiscopic cell, such as a lenticular width. The choice of units affects only the scale of the values and does not affect the determination of which light-emitting cells are employed for emission toward a given eye.

Expressing relative locations of light-emitting cells as ranges with respect to reference positions on respective multiscopic cells enables a compact and numerically efficient representation of the eye-specific visibility information.

By encoding eye-specific contributing regions as a range relative to a reference position on the multiscopic cell, the metadata can represent which light-emitting cells are visible to a given eye using a small number of numerical parameters rather than explicit per-light-emitting-cell identifiers. For example, a range such as −3.5 to −2, expressed relative to the reference position on the multiscopic cell, compactly represents that light-emitting cells located between 3.5 and 2 light-emitting cell pitches to one side of the reference position contribute to the image perceived by the given eye. This numerical encoding substantially reduces metadata size, particularly for high-resolution multiscopic displays comprising large numbers of multiscopic cells.

The use of range-based representations further simplifies multiscopic emission determination in hardware. Because each range is defined relative to a predefined reference position, determining whether a given light-emitting cell contributes to a particular eye reduces to a comparison between the relative position of the light-emitting cell and the beginning and end values of the range. This avoids costly per-cell lookup operations and enables efficient evaluation using simple arithmetic and comparison logic, which is well suited to streaming hardware implementations.

The numerical range representation is also flexible with respect to units. Ranges may be expressed in units of light-emitting cell pitch, sub-cell offsets, or fractions or multiples of a multiscopic cell width, such as a lenticular width. This flexibility allows the same underlying approach to be applied across different display resolutions, pixel pitches, and multiscopic optical geometries, with unit scaling handled by calibration parameters rather than by regenerating metadata.

By combining compact numerical encoding and efficient comparison-based evaluation, expressing relative locations of light-emitting cells as ranges relative to a reference position on a multiscopic cell reduces metadata bandwidth, supports streaming multiscopic emission determination, and enables scalable implementation of high-resolution multiscopic displays with predictable processing and memory requirements.

During operation, the hardware apparatus uses the calibration parameters to map the ranges to actual light-emitting cells of the array, thereby determining, at the granularity of individual light-emitting cells, which cells are to be employed to emit light toward the respective eye of the at least one user. In this regard, the calibration parameters comprise one or more parameters that characterize the geometric relationship between the array of light-emitting cells and the multiscopic cells of the multiscopic optical element on a per-row basis (namely, rows of light-emitting cells in the array).

In some implementations, the calibration parameters comprise at least one of:

a signed distance of a leftmost light-emitting cell, from among light-emitting cells that lie on a given row of the array and on whose optical path the given multiscopic cell lies, from the reference position on the given multiscopic cell;

a delta of the signed distance between the given row and a next row of the array;

a pitch of the multiscopic optical element along the given row.

The signed distance indicates an offset between the reference position on the multiscopic cell and a first light-emitting cell (namely, the leftmost light-emitting cell) of the given row, with the sign indicating a direction of the offset relative to the reference position.

The delta of the signed distance represents a change in relative alignment between successive rows of the array with respect to the multiscopic cell. Such relative alignment arises, for example, due to tilt, curvature, or non-zero orientation of the multiscopic optical element relative to the array of light-emitting cells. By applying the delta, the hardware apparatus can derive signed distances for successive rows without requiring independent calibration parameters for each row.

The pitch defines a spatial periodicity of the multiscopic cells along the row and enables the hardware apparatus to account for repetition of the multiscopic optical geometry when mapping relative location ranges to light-emitting cells across the array.

During operation, for a given multiscopic cell and a given row of the array, the hardware apparatus uses the signed distance of the leftmost light-emitting cell together with the pitch of the multiscopic optical element to establish a correspondence between relative location values expressed with respect to the reference position and actual positions of light-emitting cells along the row. For successive rows, the delta of the signed distance is applied to update the correspondence for each row.

Using these calibration parameters, the hardware apparatus determines, at the granularity of individual light-emitting cells, which light-emitting cells of each row fall within the ranges associated with the respective eye. This determination is performed without requiring explicit per-light-emitting-cell calibration data, thereby enabling efficient mapping of range-based metadata to physical light-emitting cells of the array.

Using the calibration parameters comprising the signed distance of the leftmost light-emitting cell, the delta of the signed distance between successive rows, and/or the pitch of the multiscopic optical element enables efficient and scalable mapping of range-based metadata to individual light-emitting cells of the array. By representing the geometric relationship between the array of light-emitting cells and the multiscopic optical element using a small number of calibration parameter values, the hardware apparatus avoids storing or processing explicit per-light-emitting-cell alignment data. This substantially reduces calibration data size and simplifies calibration workflows, particularly for high-resolution multiscopic displays comprising large numbers of light-emitting cells and multiscopic cells.

The use of a signed distance for a given row provides a simple and numerically stable reference for determining relative positions of light-emitting cells with respect to the reference position on the multiscopic cell. The inclusion of a delta of the signed distance between successive rows allows row-to-row variations, such as those caused by optical tilt or manufacturing tolerances, to be captured compactly and applied incrementally during operation. This avoids the need to independently calibrate each row of the array.

Incorporating the pitch of the multiscopic optical element further enables the hardware apparatus to account for periodic repetition of the multiscopic optical geometry along each row. As a result, contributions from light-emitting cells associated with neighbouring multiscopic cells can be handled correctly using the same calibration parameters, ensuring accurate eye-specific emission determination across an entirety of the multiscopic display.

Together, these calibration parameters support efficient, deterministic, and hardware-friendly mapping of relative location ranges to actual light-emitting cells. This enables accurate multiscopic emission determination with low computational overhead, reduced memory usage, and predictable processing behaviour, thereby supporting scalable implementation of high-resolution multiscopic displays under constrained processing and memory resources.

Moreover, in implementations where the metadata is provided at a lower spatial resolution than the full image resolution of the output image, the ranges of relative locations associated with respective multiscopic cells may vary across the 2D map of the metadata. In such implementations, the hardware apparatus determines effective ranges for intermediate positions between metadata samples by interpolating the beginning values and the end values of the ranges.

The metadata samples may be arranged on a grid corresponding to the intermediate image resolution or to another predefined sampling resolution. Each metadata sample encodes, for a given multiscopic cell, a range defining relative locations of light-emitting cells that can be employed to emit light toward a respective eye. When processing a position of the output image that lies between multiple metadata samples, the hardware apparatus determines an effective range by interpolating between the corresponding beginning values and end values of the ranges associated with neighbouring metadata samples. In implementations where the metadata samples are structured as a 2D map, the interpolation is performed independently along horizontal and vertical spatial dimensions.

In some implementations, the interpolation is linear interpolation. For example, a beginning value and an end value of a range associated with a first metadata sample and a corresponding beginning value and end value associated with a second metadata sample may be linearly interpolated based on a relative position between the two metadata samples. The same interpolation process is applied independently to the beginning value and the end value of the range. Other interpolation schemes may be employed without departing from the scope of the present disclosure.

Optionally, in this regard, when determining the light-emitting cells to be employed to emit light toward the first eye and the second eye, the processing circuitry is configured to interpolate the metadata to correspond to the full image resolution of the output image. As a result, for each light-emitting cell processed during streaming operation, the hardware apparatus uses an interpolated range corresponding to the spatial position of that light-emitting cell.

Because determining the light-emitting cells and obtaining the emission values are performed in a streaming manner, interpolation of the metadata is also performed progressively during streaming processing. The hardware apparatus interpolates only those portions of the metadata required for the current portion of the output image being processed, without requiring interpolation of an entirety of the metadata in advance. This allows the eye-specific emission determination to be resolved at the granularity of individual light-emitting cells while maintaining bounded memory usage.

Interpolating ranges of relative locations during streaming processing enables accurate eye-specific emission determination at the full image resolution while maintaining a compact metadata representation. By providing metadata at a lower spatial resolution and interpolating beginning and end values of ranges between metadata samples, the amount of metadata that must be generated, stored, and transmitted is significantly reduced. This reduction in metadata bandwidth is particularly beneficial for high-resolution multiscopic displays, where per-light-emitting-cell metadata would otherwise impose prohibitive memory and processing overhead.

Interpolation of range values further ensures smooth spatial variation of eye-specific contributing regions across the multiscopic display. Rather than exhibiting abrupt transitions at metadata sample boundaries, the ranges change gradually as a function of position. This avoids sudden changes in which light-emitting cells are employed for a given eye and reduces the likelihood of visible discontinuities, flicker, or instability in the perceived image.

Because interpolation is applied to numerical range values rather than to per-light-emitting-cell classifications, the computational complexity of interpolation is low and well suited to hardware implementation. Simple arithmetic operations are sufficient to determine interpolated beginning and end values, enabling efficient integration of interpolation into the streaming determination of light-emitting cells without introducing significant latency or additional buffering.

Furthermore, performing interpolation during streaming processing allows the hardware apparatus to interpolate only the metadata required for the current portion of the output image being generated. This avoids precomputing or storing full-resolution interpolated metadata and supports predictable and bounded resource usage.

Together, these technical benefits enable scalable and hardware-efficient multiscopic emission determination that maintains accurate eye-specific light delivery while supporting high-resolution multiscopic displays under constrained processing capability, memory bandwidth, power consumption, and thermal budgets.

It will be appreciated that in some implementations, the numerical values associated with the metadata, the calibration parameters, the interpolation operations, and the emission value determination are represented using fixed-point numerical representations. Additionally or alternatively, floating-point numerical representations may be employed. This enables efficient implementation of the described processing using hardware logic while maintaining sufficient precision for accurate multiscopic emission determination.

Furthermore, optionally, when obtaining the emission values for the determined light-emitting cells, the processing circuitry is configured to interpolate the first image and the second image on a per-light-emitting-cell basis to obtain the emission values at the full image resolution of the output image.

As described above, the first image and the second image are provided at the intermediate image resolution that is lower than the full image resolution of the output image. A spatial correspondence exists between positions in the first image and the second image and positions of light-emitting cells in the array, based on the geometry of the multiscopic display and the arrangement of the multiscopic cells.

When obtaining the emission values for a given light-emitting cell, the processing circuitry determines a corresponding position within the first image or the second image, depending on whether the light-emitting cell has been determined to emit light toward the first eye or toward the second eye. If the corresponding position lies between discrete image samples on a sampling grid of the first image or the second image, the processing circuitry determines the emission value by interpolating between neighbouring image samples.

In some implementations, the interpolation is linear interpolation performed independently along one or more spatial dimensions of the first image or the second image. For example, an emission value for a light-emitting cell may be obtained by interpolating between two or more neighbouring image samples based on a relative position of the light-emitting cell within a region corresponding to the intermediate image resolution. Other interpolation schemes may be employed without departing from the scope of the present disclosure.

The interpolation of the first image and the second image is performed on a per-light-emitting-cell basis, such that each light-emitting cell obtains an emission value derived from the first image or the second image at a spatial position corresponding to that light-emitting cell. This enables emission values to be resolved at the full image resolution of the output image, even though the first image and the second image are provided at the intermediate image resolution.

Because determining the light-emitting cells and obtaining the emission values are performed in a streaming manner, interpolation of the first image and the second image is also performed progressively during streaming processing. The processing circuitry interpolates only those portions of the first image and the second image required to obtain emission values for the light-emitting cells currently being processed, without requiring full-frame interpolation of the first image or the second image in advance.

Interpolating the first image and the second image on a per-light-emitting-cell basis enables accurate emission value determination at the full image resolution, while allowing eye-specific image content (namely, the first image and the second image) to be provided at a reduced intermediate image resolution. By generating the first image and the second image at the intermediate image resolution and interpolating image samples only when obtaining emission values for individual light-emitting cells, the amount of image data that must be generated, stored, and transmitted is significantly reduced. This lowers memory bandwidth consumption and reduces processing load in the processing unit responsible for generating the first image and the second image.

Per-light-emitting-cell interpolation further ensures that emission values vary smoothly across the array of light-emitting cells. Rather than exhibiting block-like artifacts or discontinuities associated with directly mapping intermediate-resolution image samples to multiple light-emitting cells, interpolated emission values change gradually as a function of spatial position. This improves visual quality and preserves spatial fidelity of the perceived image for each eye.

Because interpolation is performed locally for each light-emitting cell and involves simple arithmetic operations, the computational complexity of interpolation is low and well suited to hardware implementation. Integrating image interpolation into the streaming acquisition of emission values avoids the need to upsample the first image or the second image to the full image resolution as a separate processing step, thereby reducing memory usage and eliminating additional buffering.

Furthermore, performing image interpolation during streaming processing allows the hardware apparatus to interpolate only the image samples required for the current portion of the output image being generated. This supports predictable and bounded resource usage and avoids precomputing full-resolution interpolated images.

Together, these technical benefits enable efficient generation of high-resolution multiscopic output images from lower-resolution eye-specific input images, improving scalability of multiscopic displays while reducing demands on processing capability, memory bandwidth, power consumption, and thermal budget.

Moreover, in some implementations, the processing circuitry is configured to:

for a given segment of the first image, determine an amount of crosstalk toward the first eye, based on at least the second image; and adjust intensity values in the given segment of the first image, based on the amount of crosstalk determined for the given segment, wherein the intensity values are adjusted prior to obtaining the emission values for the light-emitting cells.

A segment of the first image corresponds to a spatial region of the first image at the intermediate image resolution. The segment may correspond, for example, to a block, tile, group of image samples, or another contiguous region of the first image. The segmentation of the first image may be selected based on processing granularity, streaming order, or correspondence with regions of the multiscopic display.

To determine the amount of crosstalk toward the first eye for the given segment, the processing circuitry evaluates how image content from the second image is expected to contribute unintended light toward the first eye. By "at least the second image", it is meant that the processing circuitry may additionally evaluate how image content from other eye-specific image pairs corresponding to other users is also expected to contribute unintended light toward the first eye. Such unintended contribution may arise, for example, as a result of light leakage, partial overlap of eye-specific emission regions, optical spread of the multiscopic optical element, or non-ideal separation between light-emitting cells employed for different eyes.

Based on the determined amount of crosstalk, the processing circuitry adjusts the intensity values in the given segment of the first image. The adjustment may comprise reducing, scaling, offsetting, or otherwise modifying the intensity values of image samples in the given segment, such that the adjusted first image compensates for the expected contribution of light originating from the second image (and, optionally, from the other eye-specific image pairs) toward the first eye.

The adjustment of intensity values is performed prior to obtaining the emission values for light-emitting cells. As a result, subsequent mapping of the first image to light-emitting cells incorporates the adjusted intensity values when the emission values are obtained for light-emitting cells determined to emit light toward the first eye.

Additionally, optionally, the processing circuitry is configured to:

for a given segment of the second image, determine an amount of crosstalk toward the second eye, based on at least the first image; and adjust intensity values in the given segment of the second image, based on the amount of crosstalk determined for the given segment, wherein the intensity values are adjusted prior to obtaining the emission values for the light-emitting cells.

Such crosstalk compensation can be applied as described above.

In some implementations, the determination of crosstalk and the adjustment of intensity values are performed in a streaming manner on a segment-by-segment basis. As segments of the first image and corresponding segments of the second image are processed, the processing circuitry determines crosstalk and applies intensity adjustments before proceeding to subsequent segments. This enables crosstalk mitigation to be integrated into the overall streaming pipeline without requiring full-frame buffering of the first image or the second image.

Determining crosstalk toward a given eye based on image content intended for another eye and adjusting intensity values in the image domain enables effective mitigation of inter-eye interference in multiscopic displays. By performing crosstalk determination and applying corresponding adjustments to a given image prior to emission value determination, the processing circuitry compensates for unintended light contributions before they are translated into emission values for light-emitting cells. This avoids the need for post-emission correction and allows crosstalk mitigation to be applied early in the processing pipeline.

Adjusting intensity values on a per-segment basis enables localized crosstalk compensation. Rather than applying a uniform global correction, the adjustment can be tailored to regions of the given image that are more susceptible to crosstalk. This preserves image detail and contrast in regions where crosstalk is minimal while providing stronger compensation where crosstalk is more pronounced.

Because crosstalk mitigation is performed in the image domain at the intermediate image resolution, the computational and memory overhead associated with the adjustment is significantly lower than if compensation were performed at the full image resolution. This reduces processing load and memory bandwidth requirements while still influencing emission values at the granularity of individual light-emitting cells.

Furthermore, integrating crosstalk determination and intensity adjustment into the streaming processing pipeline enables predictable and bounded resource usage. The processing circuitry operates on image segments as they are received, without requiring storage or random access to full-resolution image data. This supports scalable implementation of multiscopic displays under constraints of processing capability, memory bandwidth, power consumption, and thermal budget.

Together, these advantages enable improved eye-specific image separation and reduced visual artefacts arising from inter-eye crosstalk, while maintaining efficient and hardware-friendly generation of multiscopic output images.

Furthermore, optionally, the processing circuitry is configured to apply at least one image processing technique to at least one of: the first image, the second image. Applying the at least one image processing technique comprises modifying image samples of the first image and/or the second image prior to obtaining the emission values for the light-emitting cells. Such image processing is performed in the image domain at the intermediate image resolution and is applied before or in conjunction with subsequent steps of multiscopic emission determination and emission value acquisition.

In some implementations, determination of which image content is selected and which associated image processing is applied is performed at the granularity of individual light-emitting cells rather than at a pixel level. Accordingly, different light-emitting cells corresponding to different colour components of a same pixel location may be determined to emit light toward different eyes. For example, a light-emitting cell corresponding to a red colour component of a given pixel location may be determined to emit light toward the first eye, while a light-emitting cell corresponding to a blue colour component of the same pixel location is determined to emit light toward the second eye. Image processing and emission value determination are therefore applied independently for each such light-emitting cell based on its determined eye-specific contribution.

The at least one image processing technique may comprise one or more of the following, without limitation:

(i) Filtering, such as low-pass filtering, band-limiting, or spatial smoothing, to reduce high-frequency image components that may contribute to aliasing or crosstalk when mapped to the multiscopic optical element;

(ii) Sharpening or edge enhancement, to improve perceived clarity of image features after multiscopic emission, particularly where the multiscopic optical element reduces effective spatial resolution;

(iii) Contrast adjustment, including local or global contrast enhancement, to improve visibility of image details for a given eye;

(iv) Gamma correction or tone mapping, to adjust luminance distribution of image samples in accordance with display characteristics or perceptual response;

(v) Colour adjustment, such as colour balancing or saturation adjustment, to compensate for colour-dependent optical behaviour of the multiscopic optical element;

(vi) Spatial resampling or pre-filtering, to adapt image content to the intermediate image resolution in a manner that preserves perceptually relevant features;

(vii) Noise reduction, to suppress image noise that may otherwise be amplified or become more visible after multiscopic emission;

(viii) Learning-based or model-based image upscaling, such as neural-network-based or artificial-intelligence-based super-resolution, to reconstruct higher-resolution image samples from the first image and/or the second image prior to emission value determination.

It will be appreciated that in some implementations, learning-based or artificial-intelligence-based upscaling may be employed instead of, or in addition to, linear interpolation when mapping the first image and the second image to the full image resolution.

The aforementioned image processing techniques may be applied independently or in combination, and their parameters may be fixed or configurable.

In some implementations, the processing circuitry applies the at least one image processing technique to only one of the first image or the second image. In other implementations, the processing circuitry applies the at least one image processing technique to both the first image and the second image. The choice of whether to process one or both images may depend on system constraints, perceptual considerations, or characteristics of the multiscopic display.

In some implementations, applying the at least one image processing technique to only one of the first image or the second image is sufficient to achieve the desired perceptual effect. For example, where the at least one user exhibits a dominant eye preference, processing the image corresponding to the dominant eye may have a greater influence on perceived image quality than processing the other image corresponding to the non-dominant eye.

In such implementations, the processing circuitry may apply the at least one image processing technique preferentially to the image corresponding to the dominant eye, while leaving the other image unprocessed or processed to a lesser extent. Dominant eye preference may be determined through calibration, user input, default configuration, or known perceptual tendencies, without requiring explicit eye dominance detection during operation.

Alternatively, processing only one of the first image or the second image may be sufficient where system constraints limit available processing resources. By selectively applying image processing to a single image, the processing circuitry can achieve perceptual improvements while reducing computational load and memory bandwidth consumption.

In some implementations, the at least one image processing technique is applied in a streaming manner on a segment-by-segment basis, consistent with the streaming operation described earlier. As segments of the first image and/or the second image are received, the processing circuitry applies the at least one image processing technique to the corresponding segments prior to subsequent emission value determination. This avoids the need to buffer or process entire image frames in advance.

Applying at least one image processing technique at the intermediate image resolution enables perceptual optimization of eye-specific image content prior to multiscopic emission, without incurring the computational and memory overhead associated with full-resolution image processing. By operating on the first image and/or the second image before emission value determination, image quality improvements are propagated to the full-resolution output image at the granularity of individual light-emitting cells.

Allowing image processing to be applied to at least one of the first image or the second image provides flexibility and efficiency. In particular, when perceptual dominance of one eye is present, processing only the image corresponding to the dominant eye can yield a disproportionate improvement in perceived image quality, while avoiding redundant processing of the other image. This reduces processing load and power consumption while maintaining high perceptual fidelity.

Selective image processing also enables balancing visual quality against resource constraints. By limiting image processing to one image where appropriate, computational resources can be conserved, memory bandwidth usage can be reduced, and hardware implementation can be simplified, while still achieving meaningful improvements in perceived clarity, contrast, or stability.

Furthermore, applying image processing at the intermediate image resolution integrates naturally with the streaming architecture of the present disclosure. Image samples can be processed incrementally as they are received, avoiding full-frame buffering and maintaining predictable and bounded resource usage.

Together, these features enable flexible, perceptually effective, and hardware-efficient enhancement of eye-specific image content in multiscopic displays. By applying image processing selectively and at the intermediate image resolution, the present disclosure supports high perceived image quality while maintaining low computational overhead, reduced memory bandwidth consumption, and predictable streaming behaviour. This facilitates scalable deployment of multiscopic displays under constraints of processing capability, memory bandwidth, power consumption, and thermal budget.

The present disclosure also relates to the method as described above. Various embodiments and variants disclosed above, with respect to the aforementioned first aspect, apply mutatis mutandis to the method. In some implementations, the method described herein is implemented by the hardware apparatus described above.

Optionally, determining the light-emitting cells comprises interpolating the metadata to correspond to the full image resolution of the output image. This enables accurate determination of eye-specific light-emitting cells at the granularity of individual light-emitting cells, even when the metadata is provided at a lower spatial resolution. This allows compact, low-bandwidth metadata representations to be used while still supporting full-resolution multiscopic emission determination. As a result, the method achieves scalable, hardware-efficient operation with reduced memory usage and predictable processing behaviour, while maintaining precise eye-specific light delivery across the display.

Moreover, optionally, obtaining the emission values comprises interpolating the first image and the second image on a per-light-emitting-cell basis to obtain the emission values at the full image resolution of the output image. This enables emission values to be resolved at the full image resolution while allowing eye-specific image content to be generated at a reduced intermediate image resolution. This reduces image data generation, storage, and bandwidth requirements without sacrificing spatial fidelity of the output image. By integrating interpolation into per-cell emission value determination, the method supports smooth spatial variation of emission values and efficient streaming operation with bounded resource usage.

Furthermore, optionally, the method further comprises:
for a given segment of the first image, determining an amount of crosstalk toward the first eye, based on at least the second image; and
adjusting intensity values in the given segment of the first image, based on the amount of crosstalk determined for the given segment, wherein the intensity values are adjusted prior to obtaining the emission values for the light-emitting cells.

This enables early and localized mitigation of inter-eye interference. Performing crosstalk compensation in the image domain at the intermediate image resolution reduces computational and memory overhead while still influencing emission values at the granularity of individual light-emitting cells. This approach improves eye-specific image separation and visual quality while remaining compatible with streaming processing and predictable resource usage.

Moreover, optionally, the method further comprises applying at least one image processing technique to at least one of: the first image, the second image. This enables perceptual optimization of eye-specific image content prior to multiscopic emission, improving visual quality without requiring full-resolution image processing. Performing such image processing at the intermediate image resolution integrates naturally with streaming operation and supports scalable, hardware-efficient multiscopic image generation.

The present disclosure further relates to the multiscopic display system as described above. Various embodiments and variants disclosed above, with respect to the aforementioned first aspect, apply mutatis mutandis to the multiscopic display system.

In a first implementation, the hardware apparatus is integrated on a semiconductor device that also implements the processing unit. In some implementations, the processing unit comprises one or more general-purpose processor cores, graphics processing cores, or accelerators, while the hardware apparatus is implemented as dedicated logic on the same semiconductor device. The semiconductor device may be implemented as a system-on-chip (SoC), application-specific integrated circuit (ASIC), or a multi-core integrated processor device comprising heterogeneous processing blocks. The semiconductor device may be implemented as a single-die device or as a multi-die package, including chiplet-based or stacked-die implementations, in which the processing unit and the hardware apparatus are integrated within a common semiconductor package.

Within the semiconductor device, the processing unit and the hardware apparatus communicate through on-chip interconnects, such as an internal bus, crossbar, or network-on-chip, rather than through external interfaces. The processing unit generates the first image, the second image, and the metadata and provides them directly to the input interface of the hardware apparatus using on-chip interconnects. The integration of the hardware apparatus and the processing unit is independent of how the output image is ultimately delivered to the multiscopic display.

The calibration parameters specific to the multiscopic display may be stored in on-chip non-volatile memory, registers, or configuration storage of the semiconductor device. Alternatively, at least a portion of the calibration parameters may be programmed into the semiconductor device during initialization via firmware or control registers. The integrated hardware apparatus operates in a streaming manner as described above, processing image samples and metadata received from the processing unit without requiring off-chip transfer of the image content and the metadata.

The integration of the hardware apparatus and the processing unit on a single semiconductor device does not alter the functional operation of either component. Rather, it provides a tightly coupled implementation in which image generation, metadata generation, multiscopic emission determination, and output image generation are performed cooperatively within the same semiconductor device.

Integrating the hardware apparatus and the processing unit on a single semiconductor device reduces system complexity and eliminates the need for high-bandwidth external interfaces between image generation and multiscopic emission determination. By confining data exchange to on-chip interconnects, memory bandwidth consumption and interface latency are reduced, enabling efficient handling of high-resolution multiscopic displays.

Such integration further improves power efficiency and thermal behaviour by avoiding repeated off-chip data transfers of image samples and metadata. The streaming multiscopic emission determination can be performed using dedicated hardware logic co-located with the processing unit, allowing the processing unit to focus on generating the first image and the second image at the intermediate image resolution while the hardware apparatus generates the full-resolution output image.

Additionally, implementing both components on a single semiconductor device enables cost-effective system designs. The need for external display processing chips or high-performance display output interfaces is reduced and, in some implementations, eliminated, facilitating deployment of multiscopic displays using compact, integrated platforms. Together, these technical benefits support scalable, low-latency, and power-efficient multiscopic display systems suitable for automotive, aircraft, embedded, and other resource-constrained environments.

In a second implementation, the hardware apparatus is implemented as a separate device arranged in-line between the processing unit and the multiscopic display. In this implementation, the processing unit, the hardware apparatus, and the multiscopic display are implemented as physically distinct components. The hardware apparatus may be implemented as an external module mounted on a printed circuit board, including a field-programmable gate array (FPGA)-based accelerator, an ASIC-based video-in/video-out processing device, or another inline display processing module. In some implementations, the hardware apparatus is implemented using an FPGA, a custom ASIC, or a combination thereof, including implementations in which streaming multiscopic processing logic is implemented in an FPGA and display input/output functionality is implemented using dedicated or hardened display interface circuitry.

The processing unit is configured to generate the first image, the second image, and the metadata as described above, and to transmit the first image, the second image, and the metadata to the hardware apparatus via an external interface. The external interface may comprise, without limitation, a display interface, a high-speed serial interface, a parallel pixel interface, or a packet-based interface capable of transporting image samples and associated control information.

The hardware apparatus receives the first image, the second image, and the metadata via its input interface and performs multiscopic emission determination and emission value acquisition in a streaming manner as described above. The hardware apparatus generates the output image at the full image resolution and provides the output image to the multiscopic display via its output interface. The output interface may comprise a display interface compatible with display driver electronics of the multiscopic display.

In this in-line configuration, the hardware apparatus functions as an intermediate multiscopic processing stage that is transparent to the processing unit with respect to display timing, resolution, and output bandwidth requirements. The processing unit provides eye-specific image content (namely, the first image and the second image) at the intermediate image resolution and the metadata, while the hardware apparatus assumes responsibility for full-resolution multiscopic emission determination and output image generation.

The calibration parameters specific to the multiscopic display may be stored within the hardware apparatus, for example in persistent storage or configuration registers. Alternatively, at least a portion of the calibration parameters may be provided to the hardware apparatus during initialization or operation via a control interface, embedded within the transmitted image data, or transmitted via a side channel. The hardware apparatus applies the calibration parameters internally when mapping the metadata to the light-emitting cells of the multiscopic display.

The hardware apparatus operates independently of the internal architecture of the processing unit and independently of the internal implementation of the multiscopic display, provided that the input interface and the output interface are compatible. As a result, the hardware apparatus can be deployed as a standalone module that performs multiscopic emission determination and full-resolution output image generation without requiring substantive changes to firmware, rendering pipelines of the processing unit, or display timing of the multiscopic display, other than interface configuration and provision of metadata.

Implementing the hardware apparatus as a separate in-line device enables decoupling of multiscopic emission determination from both image content generation and display hardware. This allows existing processing units and multiscopic displays to be reused without modification.

By placing the hardware apparatus between the processing unit and the multiscopic display, full-resolution multiscopic emission processing is removed from the processing unit and from general-purpose graphics pipelines. This significantly reduces processing load, memory bandwidth consumption, and display output requirements of the processing unit, enabling the use of lower-cost or lower-performance processors.

The in-line configuration also supports modular system design. The same hardware apparatus can be paired with different processing units or different multiscopic displays by updating interface configuration or calibration parameters, without redesigning the overall system. This improves scalability across product variants and simplifies system maintenance.

Because the hardware apparatus performs multiscopic emission determination and emission value acquisition in a streaming manner, high-resolution output images can be generated with bounded latency and predictable resource usage, even when connected to external processing units over standard display interfaces. This makes the approach suitable for high-resolution, high-refresh-rate multiscopic displays.

Additionally, implementing the hardware apparatus as a separate device enables independent optimization of multiscopic processing logic. The hardware apparatus may be implemented using dedicated logic optimized for streaming arithmetic, comparison, and interpolation operations, while the processing unit remains optimized for image content generation. This separation improves power efficiency and thermal behaviour at the system level.

Together, these technical benefits enable flexible, cost-effective, and scalable deployment of multiscopic displays by allowing multiscopic emission determination to be introduced as an in-line hardware function, without imposing stringent requirements on the processing unit or the display subsystem.

In a third implementation, the hardware apparatus is integrated with display electronics of the multiscopic display. In this implementation, the hardware apparatus is implemented as part of the display electronics of the multiscopic display. The display electronics may comprise, for example, display driver integrated circuits, timing controller circuitry, column and row driver logic, or other control electronics responsible for driving the array of light-emitting cells of the multiscopic display. Such implementations may be regarded as smart-panel configurations, in which multiscopic emission determination and eye-specific light delivery are performed within the display electronics.

The hardware apparatus is integrated such that it receives the first image, the second image, and the metadata from the processing unit via an external interface and performs multiscopic emission determination and emission value acquisition locally within the display electronics. The hardware apparatus operates in a streaming manner as described above, determining, for each light-emitting cell, whether light is to be emitted toward the first eye or the second eye and obtaining corresponding emission values based on the first image and the second image.

In some implementations, the hardware apparatus is implemented as logic integrated into a display driver integrated circuit (DDIC) or timing controller (TCON) of the multiscopic display. In other implementations, the hardware apparatus is implemented as a dedicated processing block within display electronics that interface directly with row and column drivers of the array of light-emitting cells.

The calibration parameters specific to the multiscopic display may be stored within the display electronics, for example in on-chip registers, non-volatile memory, or configuration storage associated with the display electronics. Alternatively, at least a portion of the calibration parameters may be provided to the display electronics during initialization or operation via control signals, embedded metadata, or a side channel.

By integrating the hardware apparatus with the display electronics, the output image comprising emission values for the array of light-emitting cells is generated internally within the display electronics of the multiscopic display. As a result, emission values can be applied directly to the light-emitting cells without requiring the output image to traverse an external full-resolution display interface.

The functional operation of the hardware apparatus remains consistent with embodiments of the present disclosure. The processing unit generates the first image and the second image at the intermediate image resolution, along with the metadata, while the hardware apparatus integrated with the display electronics performs full-resolution multiscopic emission determination and drives the array of light-emitting cells accordingly.

Integrating the hardware apparatus with the display electronics enables multiscopic emission determination to be performed at the point of display drive, eliminating the need to transmit full-resolution output images over external display interfaces. This significantly reduces interface bandwidth requirements and simplifies system-level display output paths, particularly for high-resolution multiscopic displays.

By performing multiscopic emission determination within the display electronics, emission values can be applied directly to the array of light-emitting cells with minimal latency. This tight coupling improves timing determinism and reduces end-to-end latency between output image generation and light emission, which is advantageous for high-refresh-rate displays and latency-sensitive applications such as automotive or aircraft heads-up displays.

Such integration further improves power efficiency by avoiding repeated off-chip transfers of full-resolution emission data. Streaming multiscopic emission determination performed locally within the display electronics reduces switching activity on external interfaces and allows dedicated hardware optimized for arithmetic, comparison, and interpolation operations to be used efficiently.

Implementing the hardware apparatus within the display electronics also reduces overall system complexity. The processing unit is relieved from supporting high-bandwidth display output or full-resolution multiscopic processing, while the display electronics assume responsibility for eye-specific light delivery based on the geometry of the multiscopic optical element.

Additionally, this implementation supports compact and cost-effective display modules. By embedding multiscopic emission determination within the display electronics, external display processing components can be reduced or eliminated, enabling integrated multiscopic display assemblies suitable for space-constrained and power-constrained environments.

Together, these technical benefits enable efficient, low-latency, and power-efficient multiscopic displays by localizing multiscopic emission determination within the display electronics, while preserving the scalable, streaming-based architecture of the present disclosure and maintaining flexibility in how image content is generated by the processing unit.

Pursuant to embodiments of the present disclosure, different types of multiscopic displays can be implemented. For example, the multiscopic display can be any of, or include, hogel-based, lenticular array-based, lenslet array-based, or parallax barrier-based implementations. Depending on the type of the multiscopic display, the multiscopic optical element can be a hogel array, a lenticular array, a lenslet array, a parallax barrier, or similar. The term "multiscopic cell" encompasses a hogel in a hogel array, a lenticular lens in a lenticular array, a lenslet in a lenslet array, and a transparent portion in a parallax barrier.

The term "light-emitting cell" as used herein refers to any individually controllable emitter in the multiscopic display, including pixels, subpixels, or other individually-addressable display sampling units (such as emissive samples in a multisampling configuration). Embodiments of the present disclosure can be employed in multiscopic displays that include subpixel arrangements (such as RGB stripe or delta layouts), as well as displays without subpixels, such as monochrome displays or those using time-sequential colour (e.g., colour wheel backlit systems).

The image plane of the multiscopic display can be a light-emitting surface of the multiscopic display or an imaginary plane that is parallel to the light-emitting surface, in a case where the multiscopic display is being directly viewed. Alternatively, the image plane can be an imaginary plane in another case where an optical combiner is employed to facilitate a reflected view. The term "image plane" refers to an intended location in space where virtual content presented by the output image is perceived. This does not require the multiscopic display or other optical elements on the optical path to be physically planar. This definition applies irrespective of the optical configuration of the system, namely:

(i) in a case where a distorted image is displayed on a curved or non-curved display and reflected through a curved combiner, (ii) in a case where an undistorted image is displayed on a non-curved display and reflected through a non-curved combiner, (iii) in a case where an image is displayed on the multiscopic display and viewed directly (without any optical combiner).

DETAILED DESCRIPTION OF THE DRAWINGS

FIG. 1A is a schematic illustration of a hardware apparatus 100 for generating an output image for a multiscopic display, in accordance with an embodiment of the present disclosure. The hardware apparatus 100 comprises an input interface 102, a processing circuitry 104 and an output interface 106. The multiscopic display comprises an array of light-emitting cells and a multiscopic optical element comprising a plurality of multiscopic cells.

The input interface 102 is configured to receive:

a first image and a second image corresponding to a first eye and a second eye of at least one user, respectively, wherein the first image and the second image are provided at an intermediate image resolution that is lower than a full image resolution of the output image; and metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye.

The processing circuitry 104 is configured to operate in a streaming manner to:

for the given multiscopic cell, determine, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element; and obtain emission values for the determined light-emitting cells based on the first image and the second image.

The output interface 106 is configured to output the output image, the output image comprising emission values for the array of light-emitting cells.

It may be understood by a person skilled in the art that FIG. 1A includes a simplified example implementation of the hardware apparatus 100 and how it operates for a given multiscopic cell (and, during operation, for other multiscopic cells of the multiscopic optical element), for the sake of clarity, and should not unduly limit the scope of the claims herein. It is to be understood that the specific implementation of the hardware apparatus 100 is not to be construed as limiting it to specific types of input interfaces, processing circuitries, output interfaces, or multiscopic displays. The person skilled in the art will recognize many variations, alternatives, and modifications of embodiments of the present disclosure.

Figure 1B:
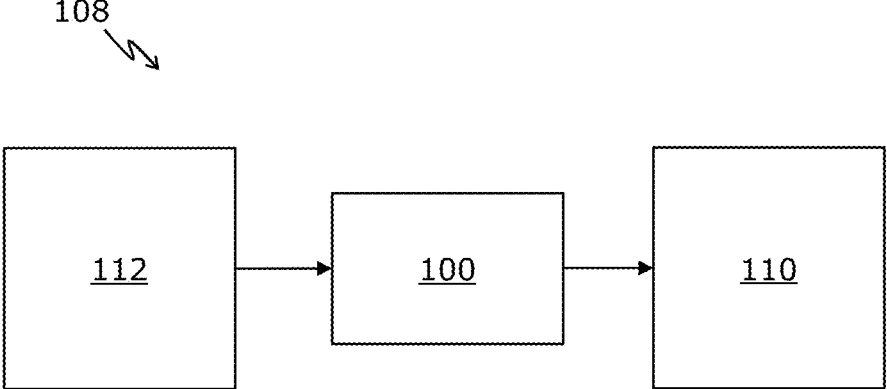
FIG. 1B is a schematic illustration of a multiscopic display system, in accordance with an embodiment of the present disclosure.

FIG. 1B is a schematic illustration of a multiscopic display system 108, in accordance with an embodiment of the present disclosure. The multiscopic display system 108 comprises:

a multiscopic display 110 comprising an array of light-emitting cells and a multiscopic optical element comprising a plurality of multiscopic cells;

the hardware apparatus 100; and a processing unit 112 configured to:

generate a first image and a second image corresponding to a first eye and a second eye of at least one user, respectively;

generate metadata indicating relative locations of light-emitting cells that can be employed to emit light toward the first eye and the second eye with respect to multiscopic cells of the multiscopic optical element; and provide the first image, the second image, and the metadata to the hardware apparatus 100.

Figure 1C:
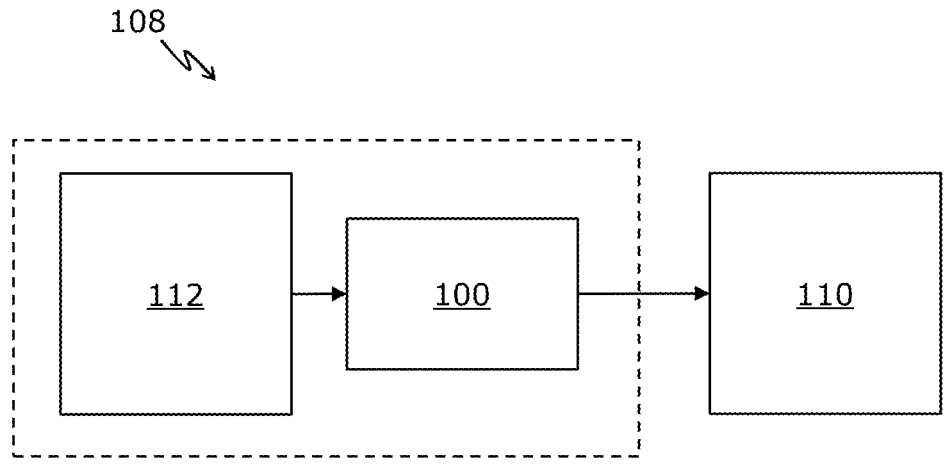
FIG. 1C depicts an implementation of the multiscopic display system, wherein the hardware apparatus is integrated on a semiconductor device that also implements a processing unit.

FIG. 1C depicts a first implementation of the multiscopic display system 108, wherein the hardware apparatus 100 is integrated on a semiconductor device that also implements the processing unit 112.

In a second implementation of the multiscopic display system 108, the hardware apparatus 100 is implemented as a separate device arranged in-line between the processing unit 112 and the multiscopic display 110.

Figure 1D:
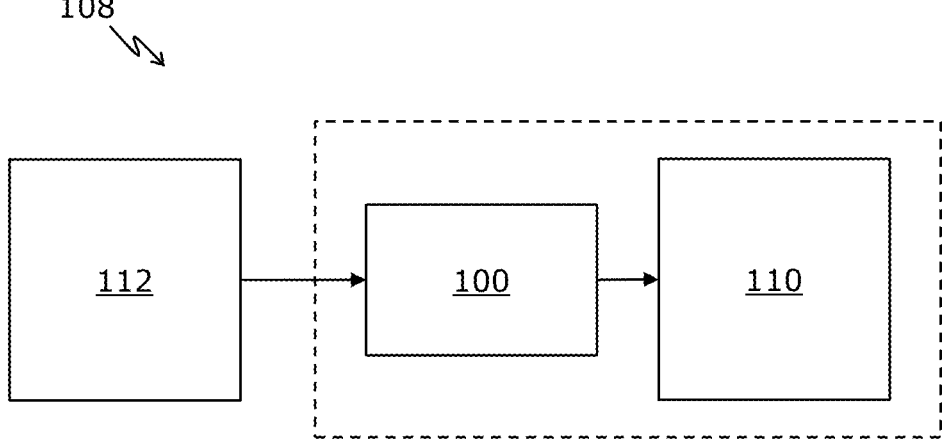
FIG. 1D depicts another implementation of the multiscopic display system, wherein the hardware apparatus is integrated with display electronics of the multiscopic display.

FIG. 1D depicts a third implementation of the multiscopic display system 108, wherein the hardware apparatus 100 is integrated with display electronics of the multiscopic display 110.

Figure 2A:
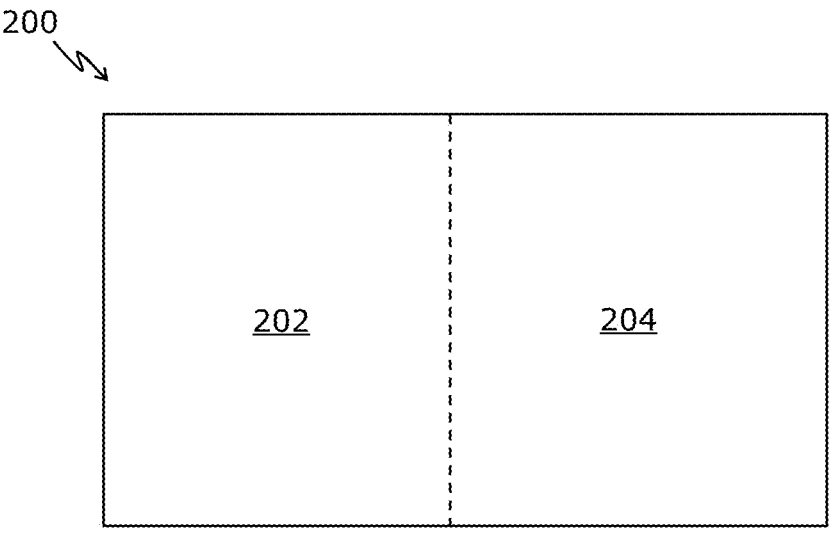
FIG. 2A depicts a single composite image into which a first image and a second image are combined using a side-by-side arrangement, in accordance with an embodiment of the present disclosure.

FIG. 2A depicts a single composite image 200 into which a first image 202 and a second image 204 are combined using a side-by-side arrangement, in accordance with an embodiment of the present disclosure.

Figure 2B:
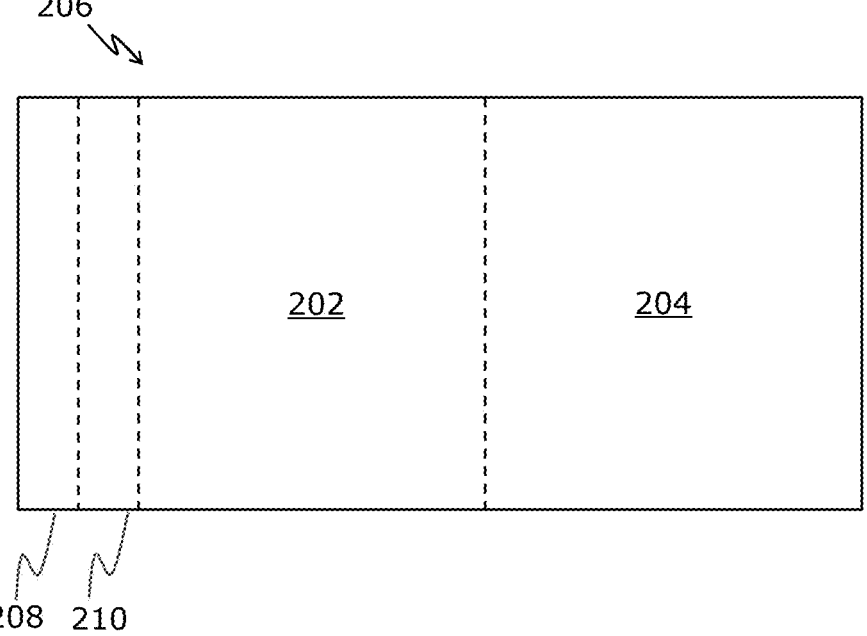
FIG. 2B depicts a single composite image into which the first image and the second image, together with metadata corresponding to a first eye and a second eye, are combined using a side-by-side arrangement, in accordance with another embodiment of the present disclosure.

FIG. 2B depicts a single composite image 206 into which the first image 202 and the second image 204, together with metadata 208 and 210 corresponding to a first eye and a second eye, respectively, are combined using a side-by-side arrangement, in accordance with another embodiment of the present disclosure.

The side-by-side arrangement has been shown for illustration purposes only. It will be appreciated that the first image 202 and the second image 204 can alternatively be combined in a stacked arrangement.

Figure 3:
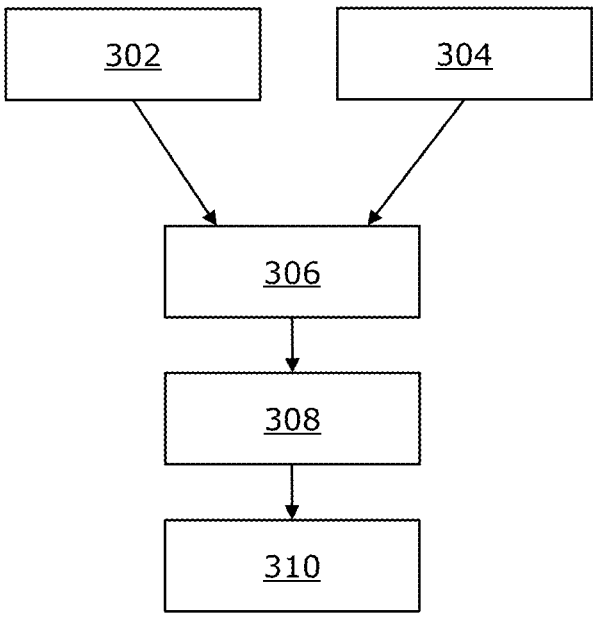
FIG. 3 depicts steps of a method for generating an output image for a multiscopic display, in accordance with an embodiment of the present disclosure.

Referring to FIG. 3, illustrated are steps of a method for generating an output image for a multiscopic display, in accordance with an embodiment of the present disclosure. The multiscopic display comprises an array of light-emitting cells and a multiscopic optical element comprising a plurality of multiscopic cells. At step 302, a first image and a second image corresponding to a first eye and a second eye of at least one user, respectively, are received, wherein the first image and the second image are provided at an intermediate image resolution that is lower than a full image resolution of the output image. At step 304, metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye, is received. At step 306, for the given multiscopic cell, it is determined, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element. At step 308, emission values are obtained for the determined light-emitting cells based on the first image and the second image. At step 310, the output image, comprising emission values for the array of light-emitting cells, is output.

Steps 306, 308 and 310 are performed in a streaming manner without requiring full-frame buffering.

The aforementioned steps are only illustrative and other alternatives can also be provided where one or more steps are added, without departing from the scope of the claims herein. For example, steps 302 and 304 can be performed simultaneously. In some implementations, steps 302 and 304 are combined into a single step.

The invention claimed is:

1. A hardware apparatus for generating an output image for a multiscopic display, the multiscopic display comprising an array of light-emitting cells and a multiscopic optical element comprising a plurality of multiscopic cells, the hardware apparatus comprising:

an input interface configured to receive:

a first image and a second image corresponding to a first eye and a second eye of at least one user, respectively, wherein the first image and the second image are provided at an intermediate image resolution that is lower than a full image resolution of the output image; and metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye;

processing circuitry configured to operate in a streaming manner to:

for the given multiscopic cell, determine, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element; and obtain emission values for the determined light-emitting cells based on the first image and the second image; and an output interface configured to output the output image, the output image comprising emission values for the array of light-emitting cells.

2. The hardware apparatus of claim 1, wherein the relative locations of light-emitting cells are expressed as a range with respect to a reference position on the given multiscopic cell.

3. The hardware apparatus of claim 2, wherein the calibration parameters comprise at least one of:

a signed distance of a leftmost light-emitting cell, from among light-emitting cells that lie on a given row of the array and on whose optical path the given multiscopic cell lies, from the reference position on the given multiscopic cell;

a delta of the signed distance between the given row and a next row of the array;

a pitch of the multiscopic optical element along the given row.

4. The hardware apparatus of claim 1, wherein when determining the light-emitting cells, the processing circuitry is configured to interpolate the metadata to correspond to the full image resolution of the output image.

5. The hardware apparatus of claim 1, wherein when obtaining the emission values, the processing circuitry is configured to interpolate the first image and the second image on a per-light-emitting-cell basis to obtain the emission values at the full image resolution of the output image.

6. The hardware apparatus of claim 1, wherein the processing circuitry is configured to:

for a given segment of the first image, determine an amount of crosstalk toward the first eye, based on at least the second image; and adjust intensity values in the given segment of the first image, based on the amount of crosstalk determined for the given segment, wherein the intensity values are adjusted prior to obtaining the emission values for the light-emitting cells.

7. The hardware apparatus of claim 1, wherein the processing circuitry is configured to apply at least one image processing technique to at least one of: the first image, the second image.

8. A multiscopic display system comprising:

a multiscopic display comprising an array of light-emitting cells and a multiscopic optical element comprising a plurality of multiscopic cells;

a hardware apparatus of claim 1; and a processing unit configured to:

generate a first image and a second image corresponding to a first eye and a second eye of at least one user, respectively;

generate metadata indicating relative locations of light-emitting cells that can be employed to emit light toward the first eye and the second eye with respect to multiscopic cells of the multiscopic optical element; and provide the first image, the second image, and the metadata to the hardware apparatus.

9. The multiscopic display system of claim 8, wherein the hardware apparatus is integrated on a semiconductor device that also implements the processing unit.

10. The multiscopic display system of claim 8, wherein the hardware apparatus is implemented as a separate device arranged in-line between the processing unit and the multiscopic display.

11. The multiscopic display system of claim 8, wherein the hardware apparatus is integrated with display electronics of the multiscopic display.

12. A method for generating an output image for a multiscopic display, the multiscopic display comprising an array of light-emitting cells and a multiscopic optical element comprising a plurality of multiscopic cells, the method comprising:

receiving a first image and a second image corresponding to a first eye and a second eye of at least one user, respectively, wherein the first image and the second image are provided at an intermediate image resolution that is lower than a full image resolution of the output image;

receiving metadata indicating, for a given multiscopic cell of the multiscopic optical element, relative locations of light-emitting cells on whose optical path the given multiscopic cell lies that can be employed to emit light toward the first eye, and relative locations of light-emitting cells on whose optical path the given multiscopic cell lies that can be employed to emit light toward the second eye;

for the given multiscopic cell, determining, based on the metadata and calibration parameters specific to the multiscopic display, which light-emitting cells of the array are to be employed to emit light toward the first eye and which light-emitting cells of the array are to be employed to emit light toward the second eye, wherein the calibration parameters indicate a positional relationship between the light-emitting cells of the array and the multiscopic cells of the multiscopic optical element;

obtaining emission values for the determined light-emitting cells based on the first image and the second image; and outputting the output image, the output image comprising emission values for the array of light-emitting cells, wherein determining the light-emitting cells, obtaining the emission values and outputting the output image are performed in a streaming manner.

13. The method of claim 12, wherein determining the light-emitting cells comprises interpolating the metadata to correspond to the full image resolution of the output image.

14. The method of claim 12, wherein obtaining the emission values comprises interpolating the first image and the second image on a per-light-emitting-cell basis to obtain the emission values at the full image resolution of the output image.

15. The method of claim 12, further comprising:

for a given segment of the first image, determining an amount of crosstalk toward the first eye, based on at least the second image; and adjusting intensity values in the given segment of the first image, based on the amount of crosstalk determined for the given segment, wherein the intensity values are adjusted prior to obtaining the emission values for the light-emitting cells.

16. The method of claim 12, further comprising applying at least one image processing technique to at least one of: the first image, the second image.

* * * * *